US012797868B2

(12) United States Patent
Ölund et al.

(10) Patent No.: US 12,797,868 B2
(45) Date of Patent: Nov. 17, 2026

(54) AUTOMATIC DISCHARGE SETTING

(71) Applicant: Tetra Laval Holdings & Finance S.A., Pully (CH)

(72) Inventors: Åke Ölund, Lund (SE); Fredrik Byhmer, Furulund (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 1277 days.

(21) Appl. No.: 17/618,434

(22) PCT Filed: Jul. 8, 2020

(86) PCT No.: PCT/EP2020/069288
§ 371 (c)(1),
(2) Date: Dec. 11, 2021

(87) PCT Pub. No.: WO2021/018537
PCT Pub. Date: Feb. 4, 2021

(65) Prior Publication Data

US 2022/0250092 A1 Aug. 11, 2022

(30) Foreign Application Priority Data

Jul. 26, 2019 (EP) .................................... 19188580

(51) Int. Cl.
*B04B 11/04* (2006.01)
*B04B 1/14* (2006.01)

(52) U.S. Cl.
CPC ................ *B04B 11/04* (2013.01); *B04B 1/14* (2013.01)

(58) Field of Classification Search
CPC .................................. B04B 11/04; B04B 1/14
(Continued)

(56) References Cited

U.S. PATENT DOCUMENTS

| | | | |
|---|---|---|---|
| 3,749,303 | A | 7/1973 | Hemfort |
| 5,318,500 | A | 6/1994 | Kelley et al. |

(Continued)

FOREIGN PATENT DOCUMENTS

| | | | |
|---|---|---|---|
| CN | 85105765 A | 1/1987 | |
| CN | 1154079 A | 7/1997 | |

(Continued)

OTHER PUBLICATIONS

Extended European Search Report issued Jan. 16, 2020, for priority European Patent Application No. 19188580.5.

(Continued)

*Primary Examiner* — Claire X Wang
*Assistant Examiner* — Shuyi S. Liu
(74) *Attorney, Agent, or Firm* — Renner, Otto, Boisselle & Sklar

(57) ABSTRACT

A method of calibrating a centrifugal separator includes retrieving stored data representing a first correlation between different amounts of sediment discharges and rotational speed reductions of the rotatable bowl, generating trigger signals to discharge different amounts of sediment, measuring rotational speed reductions of the rotatable bowl that correspond to the discharges, obtaining values corresponding to the sediment discharges based on the rotational speed reductions and the first correlation, determining data representing a second correlation between the different sediment discharges and trigger signals based on the trigger signals and the values corresponding to the sediment discharges, and obtaining a trigger signal corresponding to a desired discharge amount based on the second correlation.

10 Claims, 5 Drawing Sheets

(58) Field of Classification Search
USPC .................................... 494/1, 2, 4, 8, 9, 10
See application file for complete search history.

(56) References Cited

U.S. PATENT DOCUMENTS

| | | | |
|---|---|---|---|
| 5,800,330 | A | 9/1998 | Modéer |
| 9,266,055 | B2 | 2/2016 | Königsson et al. |
| 9,975,127 | B2 | 5/2018 | Hillström et al. |
| 10,086,384 | B2 | 10/2018 | Thorwid et al. |
| 11,027,290 | B2 | 6/2021 | Hilding |

FOREIGN PATENT DOCUMENTS

| | | | | |
|---|---|---|---|---|
| CN | 102762502 | A | 10/2012 | |
| CN | 104245146 | A | 12/2014 | |
| CN | 105228753 | A | 1/2016 | |
| CN | 108698051 | A | 10/2018 | |
| DE | 4111933 | C1 | 6/1992 | |
| DE | 102005049941 | A1 | 4/2007 | |
| DE | 102008062055 | A1 | 6/2010 | |
| DE | 102015119165 | A1 | 5/2017 | |
| SU | 1091128 | A1 | 5/1984 | |
| WO | 2015059091 | A1 | 4/2015 | |
| WO | 2015150621 | A1 | 10/2015 | |
| WO | 2018077921 | A1 | 5/2018 | |
| WO | WO-2018177711 | A1 * | 10/2018 | ........... B01D 21/262 |

OTHER PUBLICATIONS

International Search Report mailed Oct. 8, 2020, for priority International Patent Application No. PCT/EP2020/069288.

* cited by examiner

AUTOMATIC DISCHARGE SETTING

TECHNICAL FIELD

The invention relates to a method and system for calibrating a centrifugal separator used to separate an unseparated liquid food into different phases by centrifugal separation.

TECHNICAL BACKGROUND

Centrifugal separation is used in the production of milk. A centrifugal separator includes a rotatable bowl having a disc stack. An unseparated liquid food, such as the milk received from a cow, is supplied to the centrifugal separator for separation into multiple outputted milk products. By way of centrifugal force, sediment or sludge, e.g. straw, hairs, udder cells, white blood corpuscles (leucocytes), red blood corpuscles, bacteria, and other debris, and fat globules, e.g. cream, settles radially outwardly or inwardly in the separation channels of the bowl according to the relative density as compared with a continuous medium, such as a skim milk product. The high-density solid impurities of the sediment phase settle outwardly toward the periphery of the separator and collect in a sediment space. The skim milk also moves outwardly toward the periphery of the disc stack. The cream has a lower density than the skim milk such that the cream moves inwardly in the channels toward the axis of rotation and then to an axial outlet. The skim milk moves outwardly to a space outside the disc stack and through a channel of the bowl to a concentric skim milk outlet.

During the milk production process, the sediment, or sludge, is ejected from the separator bowl through slots in the bowl at predetermined intervals. The size or amount of discharge and the amount of time for discharge each has a precise value to ensure that all of the sediment is discharged without discharging the milk product. If a discharge is performed too quickly or too large of an amount of discharge is ejected, the milk product may be lost. The desired amount of discharge is dependent on the size of the bowl, but determining whether the desired amount of discharge is actually being discharged from the bowl is difficult. Conventional discharge methods include manually measuring the weight of the discharge repeatedly until the desired discharge size is obtained. However, conventional discharge methods are disadvantageous due to the burdensome process of the manual trial and error method.

SUMMARY

It is an object of the invention to at least partly overcome one or more limitations of the prior art. In particular, it is an object to provide a method for calibrating the centrifugal separator that enables automation of sediment discharging.

According to an aspect of the invention, a method of calibrating a centrifugal separator is used for a centrifugal separator having a rotatable bowl with a disc stack. The centrifugal separator receives an intake of unseparated liquid food that passes through the disc stack for separation into a heavy product phase, a light product phase, and a sediment phase by centrifugal separation. The method includes retrieving stored data representing a first correlation between different amounts of discharges of the sediment and rotational speed reductions of the rotatable bowl due to the discharges, generating a first trigger signal to discharge a first amount of sediment, measuring a first rotational speed reduction of the rotatable bowl that corresponds to the discharge of the first amount of sediment, obtaining a first value corresponding to the first amount of sediment based on the first rotational speed reduction and the stored data representing the first correlation, generating a second trigger signal to discharge a second amount of sediment, measuring a second rotational speed reduction of the rotatable bowl that corresponds to the discharge of the second amount of sediment, obtaining a second value corresponding to the second amount of sediment based on the second rotational speed reduction and the stored data representing the first correlation, determining data representing a second correlation between the different amounts of discharges of the sediment and trigger signals, based on the first and second trigger signals and the first and second values corresponding to the first and second amounts of sediment, and obtaining a third trigger signal corresponding to a desired amount of sediment to be discharged, based on the determined data representing the second correlation.

The method described herein is advantageous in eliminating the manual process of repeatedly measuring different discharge amounts. Predetermined data pertaining to the correlation or relationship between different amounts of discharge and rotational speed reductions for a particular separator type is stored. Using the stored data and the measured rotational speed reductions enables the amounts of discharges to be automatically determined based on the measured rotational speed reduction without manually measuring the discharge amount. The discharges are performed in response to trigger signals, such that the determined amounts of the discharges are then used to determine the correlation between the trigger signals and the amounts of the discharges. The trigger signals may correspond to any suitable system parameter or setting, such as an amount of air or water pressure, an amount of air or water flow, or an amount of time for a flow of air or water that is supplied to the centrifugal separator for performing the discharges. Using the determined correlation between the trigger signals and the discharge amounts enables a single parameter or setting in the system to be changed to obtain the desired discharge amount. The centrifugal separator may be calibrated and the discharge method may be automated using a processor and control system to perform the method.

According to another aspect of the invention, a calibration system is used for a centrifugal separator having a rotatable bowl with a disc stack. The centrifugal separator receives an intake of unseparated liquid food that passes through the disc stack for separation into a heavy product phase, a light product phase and a sediment phase by centrifugal separation. The calibration system includes a memory in which data representing a first correlation is stored, with the first correlation being a correlation between different amounts of discharges of the sediment and rotational speed reductions of the rotatable bowl due to the discharges, an input unit configured to generate trigger signals to discharge different amounts of sediment, a sensor arranged to detect rotational speed reductions of the rotatable bowl that correspond to the different amounts of sediment, and a processor communicatively coupled to the memory and the sensor. The processor is configured to obtain values corresponding to the amounts of sediment based on the rotational speed reductions and the stored data representing the first correlation, determine data representing a second correlation that is a correlation between the different amounts of discharges of the sediment and trigger signals, based on the trigger signals and the obtained values corresponding to the amounts of sediment, and obtain a desired trigger signal corresponding to a desired amount of sediment to be discharged, based on the determined data representing the second correlation.

Although various aspects of the invention are set out in the accompanying independent claims, other aspects of the invention may include any combination of features from the described features and/or the accompanying dependent claims with the features of the independent claims, and not only the combinations explicitly set out in the accompanying claims.

BRIEF DESCRIPTION OF THE DRAWINGS

Features of the invention will now be described, by way of example, with reference to the accompanying schematic drawings.

DETAILED DESCRIPTION

The method and system according to the present invention has particular application in centrifugal separators used in the production of milk products. More particularly, the method is used for a centrifugal separator that receives an intake of unseparated liquid food and produces multiple milk products, such as a heavy product phase and a light product phase.

The present invention pertains to a calibration method for discharging sediment from a centrifugal separator having a rotatable bowl that includes retrieving stored date representing a predetermined correlation between different amounts of discharges of the sediment phase and rotational speed reductions of the rotatable bowl due to the performed discharges for a particular centrifugal separator, generating trigger signals to discharge different amounts of the sediment, measuring the rotational speed reductions of the rotatable bowl that correspond to the performed discharges, obtaining values corresponding to the amounts of sediment based on the rotational speed reductions and the first correlation, determining data representing another correlation between the different amounts of discharges of the sediment and trigger signals based on the trigger signals and the values corresponding to the discharged amounts of sediment, and obtaining a desired trigger signal that corresponds to a desired amount of sediment to be discharged for the centrifugal separator, based on the determined data representing the second correlation.

Advantageously, the amounts of discharges that are discharged in response to the generated trigger signals do not need to be manually measured. Rather, the rotational speed reductions of the rotatable bowl are measured and the predetermined correlation between the amounts of discharges and the rotational speed reductions for the centrifugal separator is used to determine the precise amounts of the discharges. After the amounts are obtained using the stored correlation, the obtained amounts enable the determination of the correlation between the trigger signals and different amounts of discharge. The determined correlation is then used to obtain a specific trigger signal that corresponds to a desired amount of discharge for the centrifugal separator. The method may be automated using a system having a memory, a processor, and sensors as compared with conventional methods that require a manual trial and error procedure until the desired discharge amount is obtained.

Figure 1:
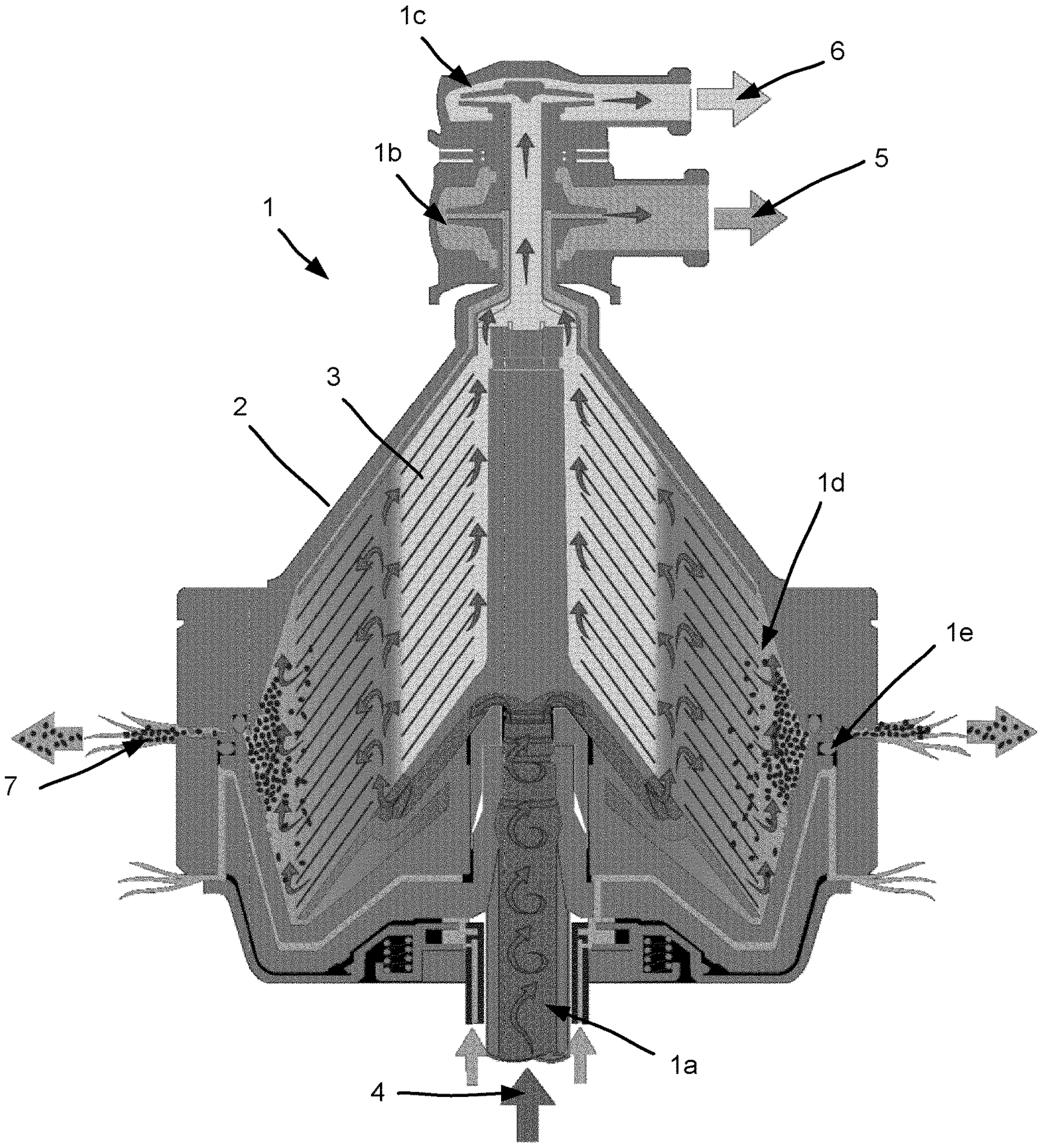
FIG. 1 is a sectional view of a centrifugal separator used in milk production.

Referring first to FIG. 1, a centrifugal separator 1 for milk production is shown. The centrifugal separator 1 includes a rotatable bowl 2 with a disc stack 3, and is configured to receive an intake of unseparated liquid food 4, such as milk from a cow. The rotatable bowl 2 may be rotatable by a motor or any other suitable drive mechanism. The intake of unseparated liquid food 4 passes through the disc stack 3. By way of centrifugal force, the unseparated liquid food 4 is separated into a sediment phase 7, which may include straw, hairs, udder cells, white blood corpuscles, red blood corpuscles, bacteria, and other debris, a heavy product phase 5, such as skim milk, and a light product phase 6, such as cream. The intake of unseparated liquid food 4 may be received through an inlet 1*a* arranged at the bottom of the centrifugal separator 1 and the heavy product phase 5 and the light product phase 6 may exit the centrifugal separator 1 through axial outlets 1*b*, 1*c*, respectively, arranged at a top of the centrifugal separator 1. Due to the density of the sediment phase 7, the sediment settles radially outwardly toward the periphery of the centrifugal separator 1 and collects in a sediment space 1*d* of the centrifugal separator 1. The sediment phase 7 is discharged through slots 1*e* formed in the sides of the centrifugal separator 1.

The volume of the sediment space 1*d* is dependent on the size of the centrifugal separator 1 and the total amount of the sediment phase 7 that is collected in the sediment space 1*d* may vary. The sediment space volume may be between 10 and 20 liters and the total amount of the sediment phase 7 may be approximately 1 kilogram per 10,000 liters. The rotatable bowl 2 may be self-cleaning in that the accumulated sediment or discharge is automatically ejected at pre-set intervals, such as at 20-minute, 30-minute, or 60-minute intervals during the separation process. The amount of sediment 7 to be discharged from the centrifugal separator 1 is dependent on the volume of the sediment space 1*d*, the total amount of the sediment phase 7, and the intended milk products. An entire amount of sediment 7 that accumulates in the sediment space 1*d* may be ejected from the centrifugal separator 1 and this amount is referred to herein as the desired amount of discharge.

Figure 2:
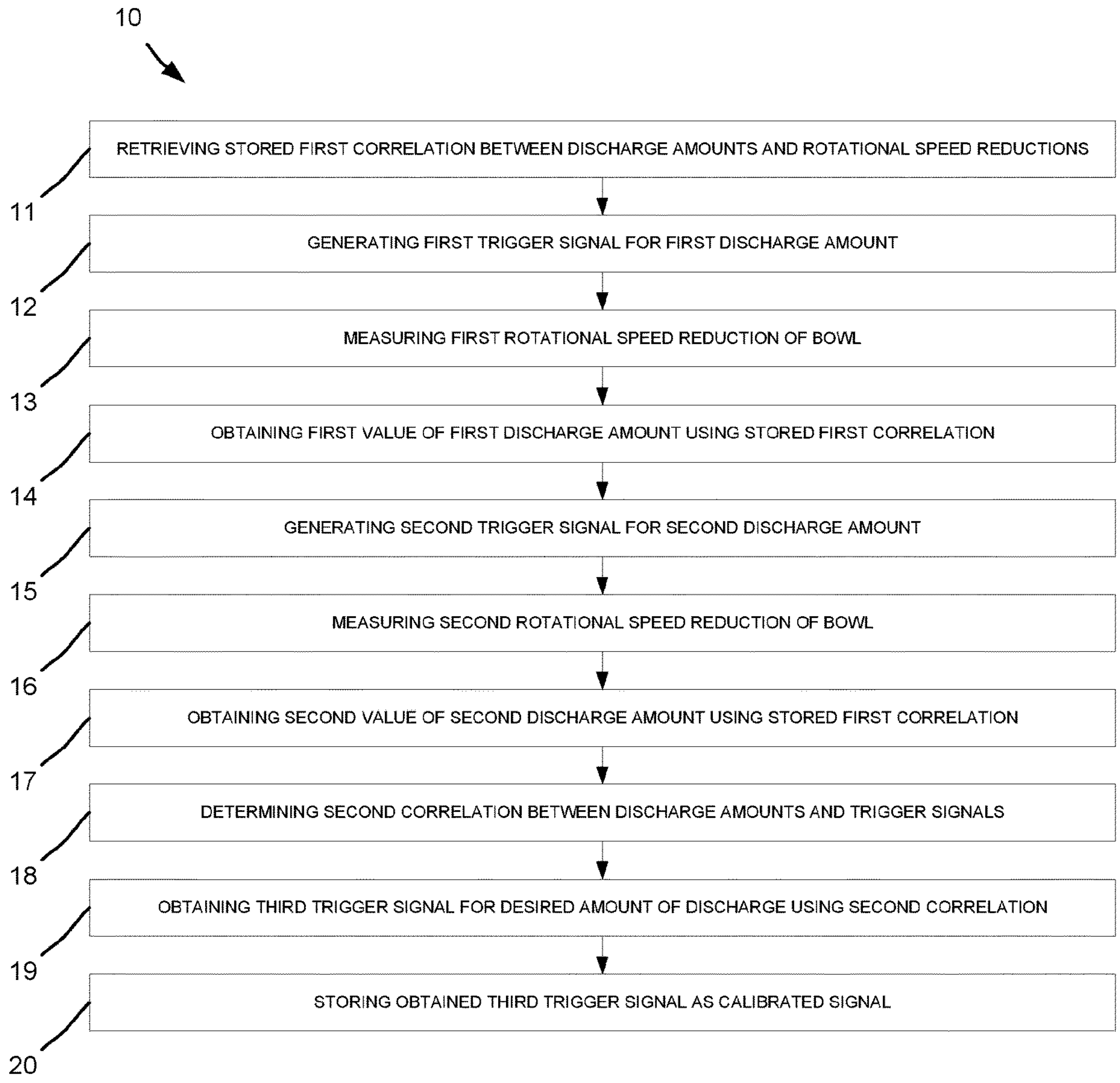
FIG. 2 is a flow chart of a method of calibrating a centrifugal separator, such as the centrifugal separator of FIG. 1.

Referring in addition to FIG. 2, the centrifugal separator 1 may be calibrated using the method 10 shown in the flow chart of FIG. 2. The method 10 includes retrieving 11 stored data representing a first correlation between different sizes or amounts of discharges of the sediment 7 and rotational speed reductions of the rotatable bowl 2 due to the discharges. The stored data may be predetermined for a particular type of the centrifugal separator 1. The correlation is dependent on the size of the centrifugal separator 1. The stored data may include a graph or table in which the discharge amount is shown as a function of the rotational speed reduction of the rotatable bowl 2, such that each discharge amount corresponds to a specific rotational speed reduction. The stored data may use weights, volumes, or densities of the sediment 7.

The method 10 further includes generating 12 a first trigger signal to discharge a first amount of sediment 7 and measuring 13 a first rotational speed reduction of the rotatable bowl 2 that corresponds to the discharge of the first amount of sediment 7. The first rotational speed reduction corresponds to the decrease in rotational speed of the bowl relative to the rotational speed of the bowl when the bowl is at capacity and before the discharge is performed. The first trigger signal may correspond to any suitable parameter or setting for the centrifugal separator 1, including an amount of fluid pressure or flow, or an amount of time for supplying the fluid pressure or flow to the centrifugal separator 1 to perform the discharge. The rotational speed reduction may be measured using any suitable sensor, including a rotational speed sensor, a phase sensor, a frequency inverter for detecting a change in frequency, or an energy sensor used to detect a change in energy provided to the motor that drives the rotatable bowl 2. Measuring the rotational speed reduction may be achieved using any sensor providing an output from which the rotational speed reduction could be determined. A rotational speed reduction may correspond to an increase in current or other system variables.

After the first rotational speed reduction is measured, the method 10 includes obtaining 14 a first value that corresponds to the first amount of sediment that was discharged. The first value is obtained by referencing the stored data representing the first correlation and obtaining the value of the discharge amount that corresponds to the measured rotational speed reduction. After the first discharge amount value is obtained, the method 10 includes generating 15 a second trigger signal to discharge a second amount of sediment 7 and measuring 16 a second rotational speed reduction of the rotatable bowl 2 that corresponds to the discharge of the second amount of sediment 7. The second trigger signal may be larger than the first trigger signal such that the second amount of sediment 7 may be greater than the first amount of sediment 7. Generating 15 the second trigger signal may include adjusting any parameter for the centrifugal separator 1 such as supplying more fluid pressure to the centrifugal separator 1 or increasing a time period for discharging the second amount of sediment 7 relative to a time period for discharging the first amount of sediment 7.

After the second rotational speed reduction is measured, the method 10 includes obtaining 17 a second value that corresponds to the second amount of sediment by referencing the stored data representing the first correlation and obtaining the value of the discharge amount that corresponds to the measured second rotational speed reduction. After obtaining the second value, the method 10 includes then determining 18 data representing a second correlation between the different amounts of discharges of the sediment 7 and the trigger signals. Any suitable processing device may be used to determine the data representing the second correlation by using the first and second values corresponding to the discharged amounts of sediment 7 and the first and second trigger signals that were generated to perform the corresponding discharges. The second correlation may be determined by interpolating or extrapolating other amounts of discharges of the sediment and trigger signals based on the comparison between the first and second trigger signals and the first and second values corresponding to the first and second amounts of sediment. The data representing the second correlation may include a graph in which the discharge amount is shown as a function of the trigger signal, such that each discharge amount corresponds to a trigger signal. Weights, volumes, or densities of the discharge amount may be used and the trigger signal may correspond to fluid pressure, flow, the amount of time for supplying a fluid pressure or flow, or any other suitable system parameters that are used to perform the discharge.

When the second correlation is determined, the method 10 includes then using the data representing the second correlation to obtain a third trigger signal corresponding to a desired amount of sediment 7 to be discharged. For a particular centrifugal separator 1 and milk product to be produced by the centrifugal separator 1, the desired amount of discharge is predetermined. Obtaining the third trigger signal includes referencing the graph and obtaining the value for the third trigger, such as a fluid pressure, that pertains to the desired amount of discharge for the centrifugal separator 1. When the third trigger signal is obtained, the method 10 may then include storing 20 the obtained third trigger signal as a calibrated signal to be used for discharging sediment 7 in operation of the centrifugal separator 1. Advantageously, only one parameter for the centrifugal separator 1 may then be changed to obtain the desired amount of discharge. If the trigger signals correspond to different amounts of fluid pressure being supplied to the centrifugal separator 1, such that the amount of fluid pressure is changed to obtain the desired discharge amount, the time duration for each discharge may remain constant. Alternatively, if the trigger signals correspond to different amounts of time for supplying an amount of fluid pressure to the centrifugal separator 1, the amount of fluid pressure may remain constant.

Figure 3:
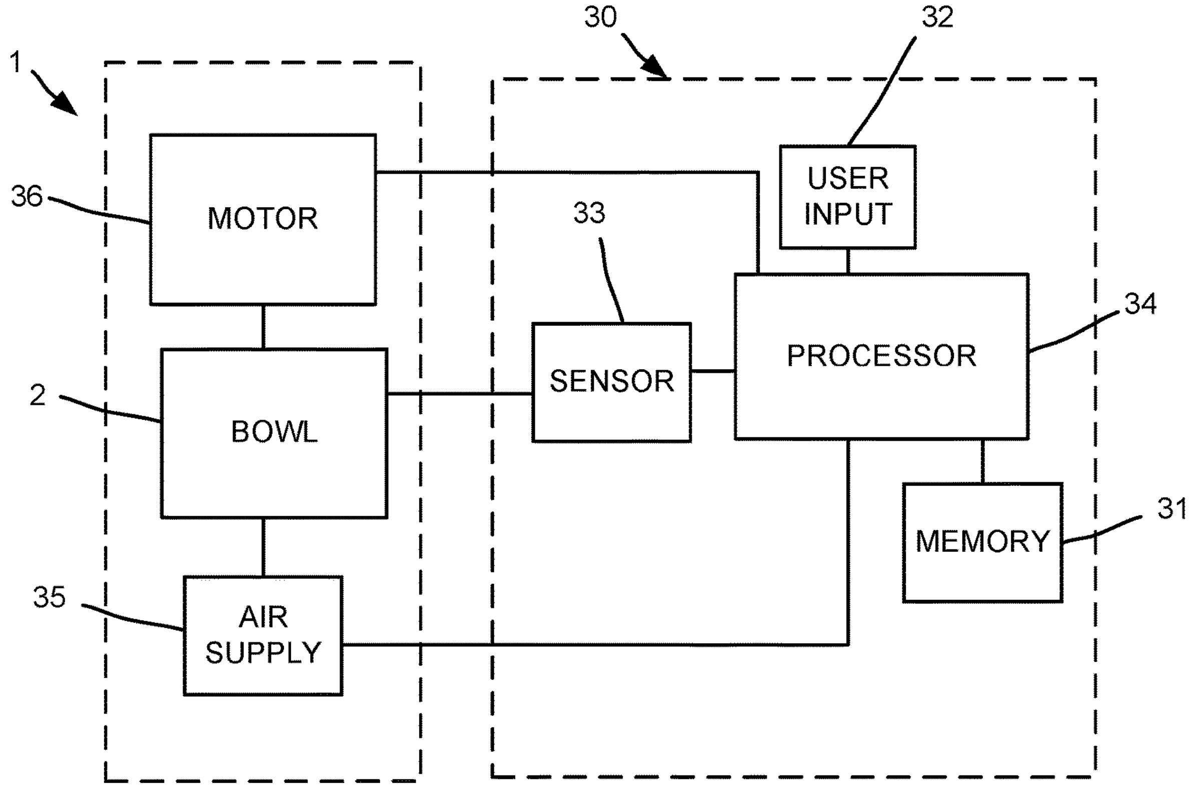
FIG. 3 is a schematic drawing of a calibration system for performing the method shown in the flow chart of FIG. 2.

Referring in addition to FIG. 3, the method 10 may be carried out using a calibration system 30 for the centrifugal separator 1. The system 30 may include a non-transitory computer readable medium having a program stored thereon for carrying out the method 10 when executed by a computer. The calibration system 30 includes a memory 31 in which the data representing the first correlation between the different amounts of discharges of the sediment 7 and the rotational speed reductions of the rotatable bowl 2 due to the discharges is stored for the predetermined centrifugal separator 1.

The memory 31, a user input 32, and a sensor 33 are communicatively coupled to a processor 34 for communication therewith. The processor 34 may comprise any suitable electronic control mechanism, such as for example a central processing unit (CPU), microprocessor, control circuitry, and the like. The user input 32 may include a user interface that is operable by a user of the centrifugal separator 1 and receives a command from the user. The user input 32 is configured to generate the trigger signals for discharging the different amounts of sediment 7. The user may select a trigger signal pertaining to an amount of pressurized air or water supply for the centrifugal separator 1. The processor 34 is configured to receive the user input 32 and is in communication with a source of the pressurized air or water supply 35 for supplying the amount of pressurized air or water supply to the centrifugal separator 1 to perform a discharge.

When the discharge is performed, the sensor 33 is arranged proximate the rotatable bowl 2 to detect the rotational speed reduction of the rotatable bowl 2 that corresponds to the discharge. The sensor 33 may include a speed sensor, a phase sensor, a frequency inverter for detecting a change in frequency, or an energy sensor used to detect a change in energy provided to the motor 36 of the centrifugal separator 1 which drives the bowl 2. The processor 34 is configured to receive the detected rotational speed reductions from the sensor 33 and obtain values corresponding to the amounts of sediment 7 by accessing the data representing the first correlation that is stored in the memory 31.

The processor 34 is also configured to determine the second correlation between the different amounts of discharges of the sediment and the trigger signals based on the trigger signals received from the user input 32 and the obtained values of the discharged amounts of sediment 7. The desired trigger signal corresponding to the desired amount of the sediment to be discharged may also be obtained by the processor 34 based on the second correlation determined by the processor 34. The desired trigger signal may then be stored in the memory 31 as a calibrated signal for the centrifugal separator 1. Accordingly, using the calibration system 30 is advantageous in that the calibration method may be automatically performed by the calibration system 30 including the processor and sensor.

Figure 4:
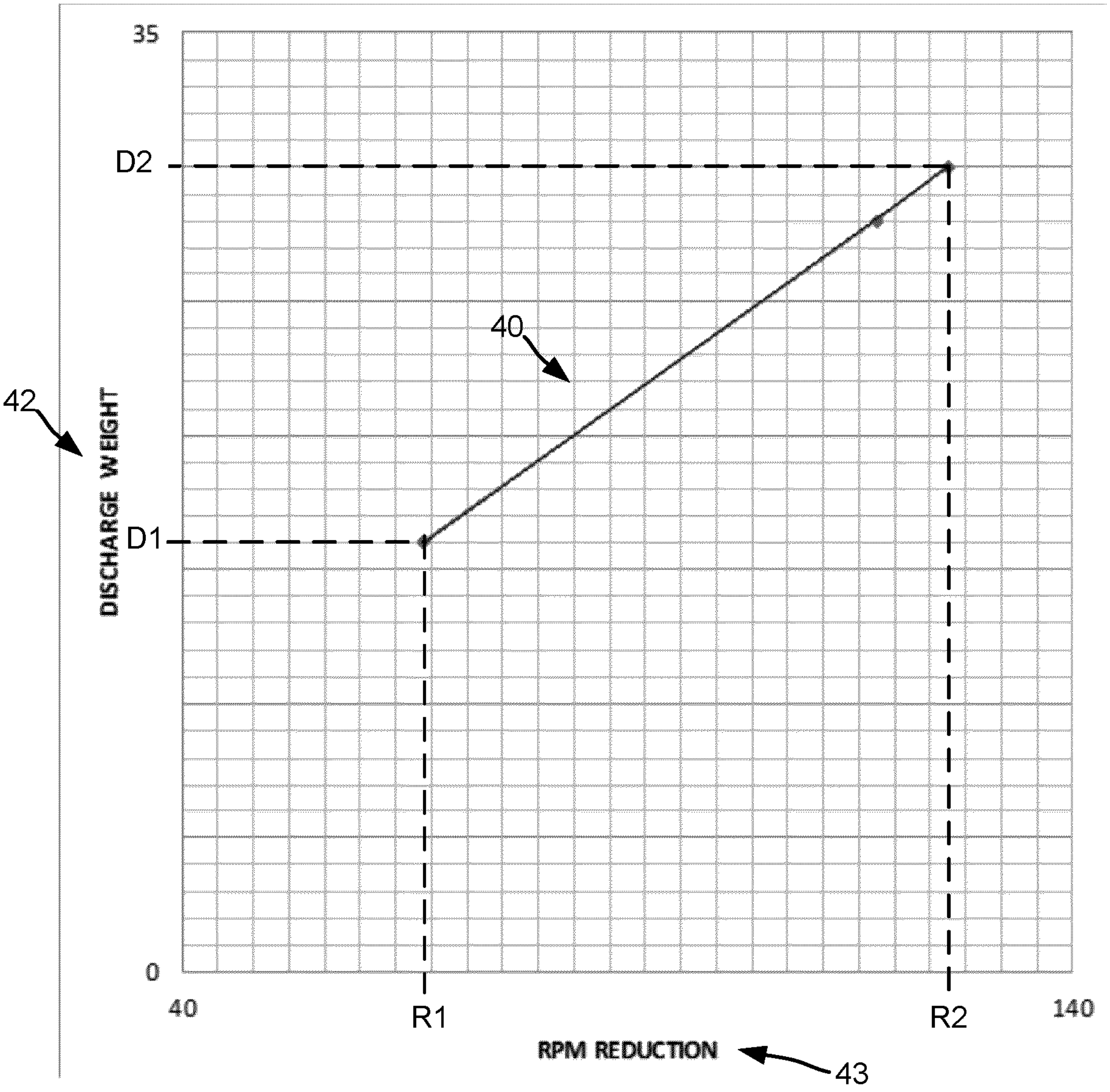
FIG. 4 is a graph showing a predetermined correlation between different amounts of discharges and rotational speed reductions for a particular centrifugal separator.
Figure 5:
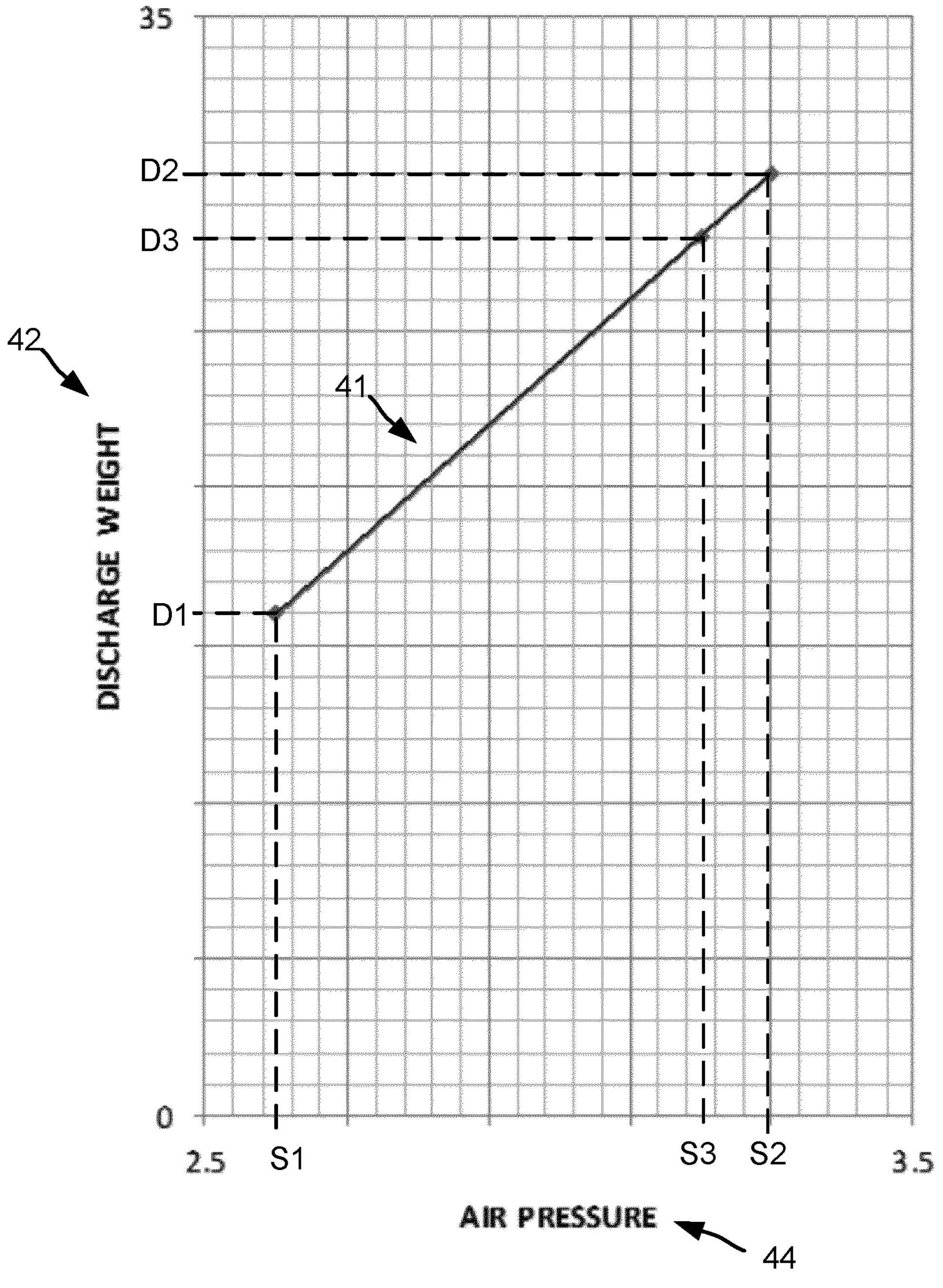
FIG. 5 is a graph showing a determined correlation between different amounts of discharges and amounts of air pressure that is determined using the method shown in the flow chart of FIG. 2.

Referring in addition to FIGS. 4 and 5, graphical data, such as reference tables, representing a first correlation 40, as previously described, and a second correlation 41, as previously described for a particular centrifugal separator are shown. The correlations 40, 41 may be linear functions. FIG. 4 shows the first correlation 40 between the different sizes or amounts of discharges 42 and the different rotational speed reductions 43 for the separator. The data representing the first correlation 40 may be predetermined for the centrifugal separator and stored in the memory 31 of the calibration system 30 shown in FIG. 3. FIG. 4 shows the second correlation 41 between the different sizes or amounts of discharges 42 and the trigger signals, or system parameters, e.g. air pressures 44. The data representing the second correlation 41 may be determined by the processor 34. As shown in FIG. 5, the first trigger signal S1 is generated by the user input 32 and corresponds to an air or fluid pressure of approximately 2.6 bar (37.7 psi) and the first rotational speed reduction R1, as shown in FIG. 4.

The at-capacity rotational speed of the bowl may be between 4000 and 5000 rpm, such as 4215 rpm. The first rotational speed reduction R1 is detected by the sensor 33 to have a value of approximately 67 rpm. R1 is then referenced on the graph representing the first correlation 40 to obtain the first value D1 pertaining to the first amount of discharge, e.g. the weight of the first discharge, which corresponds to the first trigger signal S1. The first correlation 40 indicates that the first value D1 is approximately 16 kilograms. Accordingly, 16 kilograms of discharge corresponds to a supplied air or fluid pressure of 2.6 bar, as shown in the second correlation 41 of FIG. 5.

As shown in FIG. 5, the second trigger signal S2 is greater than the first trigger signal S1 and may correspond to an air or fluid pressure of approximately 3.3 bar (47.9 psi) and the second rotational speed reduction R2, as shown in FIG. 4. The second rotational speed reduction R2 is greater than the first rotational speed reduction R1 and is detected by the sensor 33 to have a value of approximately 126 rpm. R2 is then referenced on the graph representing the first correlation 40 to obtain the second value D2 pertaining to the weight of the second discharge which corresponds to the second trigger signal S2. The first correlation 40 indicates that the second value D2 is approximately 30 kilograms. Accordingly, 30 kilograms of discharge corresponds to an air of fluid pressure of 3.3 bar, as shown in the second correlation 41 of FIG. 5. Using D1, D2, S1, and S2, the second correlation 41 may be interpolated or extrapolated by the processor 34.

The second correlation 41 may then be stored as graphical data for the particular centrifugal separator. After referencing the graphical data representing the second correlation 41, a third trigger signal S3 is obtained for a desired amount of discharge D3. The third trigger signal S3 is obtained by referencing the graphical data and obtaining the trigger value pertaining to the desired amount of discharge D3. The desired amount of discharge D3 is between the amounts of the first and second amounts D1, D2 of discharge and the trigger signal S3 is between the trigger signals S1, S2. If the desired amount of discharge D3 is 28 kilograms, the trigger signal S3 may be 3.2 bar. Accordingly, a precise trigger signal may be obtained for a particular amount of discharge and the centrifugal separator is manually or automatically calibrated to set the trigger signal to 3.2 bar to obtain the discharge of 28 kilograms.

A method of calibrating a centrifugal separator is used for a centrifugal separator having a rotatable bowl with a disc stack. The centrifugal separator receives an intake of unseparated liquid food that passes through the disc stack for separation into a heavy product phase, a light product phase, and a sediment phase by centrifugal separation. The method includes retrieving stored data representing a first correlation between different amounts of discharges of the sediment and rotational speed reductions of the rotatable bowl due to the discharges, generating a first trigger signal to discharge a first amount of sediment, measuring a first rotational speed reduction of the rotatable bowl that corresponds to the discharge of the first amount of sediment, obtaining a first value corresponding to the first amount of sediment based on the first rotational speed reduction and the stored data representing the first correlation, generating a second trigger signal to discharge a second amount of sediment, measuring a second rotational speed reduction of the rotatable bowl that corresponds to the discharge of the second amount of sediment, obtaining a second value corresponding to the second amount of sediment based on the second rotational speed reduction and the stored data representing the first correlation, determining data representing a second correlation between the different amounts of discharges of the sediment and trigger signals, based on the first and second trigger signals and the first and second values corresponding to the first and second amounts of sediment, and obtaining a third trigger signal corresponding to a desired amount of sediment to be discharged, based on the determined data representing the second correlation.

The method may include storing the obtained third trigger signal as a calibrated signal to be used for discharging sediment in operation of the centrifugal separator.

Determining data representing the second correlation may include interpolating or extrapolating other amounts of discharges of the sediment and trigger signals based on the comparison between the first and second trigger signals and the first and second values corresponding to the first and second amounts of sediment.

Generating the second trigger signal may include generating a signal that is larger relative to the first trigger signal to discharge a greater amount of sediment as compared with the first amount of sediment.

Generating the second trigger signal may include increasing a time period for discharging the second amount of sediment relative to a time period for discharging the first amount of sediment.

Generating the trigger signals may include supplying a pressurized fluid for a predetermined period of time.

Supplying the pressurized fluid may include using pressurized air or pressurized water.

Measuring the first and second rotational speed reductions includes using at least one sensor.

The method may include using a processor that is communicatively coupled to the sensor for determining data representing the second correlation.

Obtaining the values corresponding to the first and second amounts of sediment may include obtaining weights or volumes of the first and second amounts.

A non-transitory computer readable medium may have stored thereon a program which, when executed by a computer, carries out the calibration method described herein.

A calibration system is used for a centrifugal separator having a rotatable bowl with a disc stack. The centrifugal separator receives an intake of unseparated liquid food that passes through the disc stack for separation into a heavy product phase, a light product phase and a sediment phase by centrifugal separation. The calibration system includes a memory in which data representing a first correlation is stored, with the first correlation being a correlation between different amounts of discharges of the sediment and rotational speed reductions of the rotatable bowl due to the discharges, an input unit configured to generate trigger signals to discharge different amounts of sediment, a sensor arranged to detect rotational speed reductions of the rotatable bowl that correspond to the different amounts of sediment, and a processor communicatively coupled to the memory and the sensor. The processor is configured to obtain values corresponding to the amounts of sediment based on the rotational speed reductions and the stored data representing the first correlation, determine data representing a second correlation that is a correlation between the different amounts of discharges of the sediment and trigger signals, based on the trigger signals and the obtained values corresponding to the amounts of sediment, and obtain a desired trigger signal corresponding to a desired amount of sediment to be discharged, based on the determined data representing the second correlation.

While the invention has been described with reference to one or more preferred features, which features have been set forth in considerable detail for the purposes of making a complete disclosure of the invention, such features are merely exemplary and are not intended to be limiting or represent an exhaustive enumeration of all aspects of the invention. The scope of the invention, therefore, shall be defined solely by the following claims. Further, it will be apparent to those of skill in the art that numerous changes may be made in such details without departing from the spirit and the principles of the invention.

The invention claimed is:

1. A method of calibrating a centrifugal separator having a rotatable bowl with a disc stack, wherein the centrifugal separator receives an intake of unseparated liquid food that passes through the disc stack for separation into a heavy product phase, a light product phase and a sediment phase by centrifugal separation, and the method being performed by a calibration system coupled to the centrifugal separator and including a processor, a memory, and a sensor, the method comprising:

the processor retrieving stored data from the memory representing a first correlation, the first correlation being a correlation between different amounts of discharges of the sediment and rotational speed reductions of the rotatable bowl due to the discharges;

the processor generating a first trigger signal to cause the centrifugal separator to discharge a first amount of sediment;

the sensor measuring a first rotational speed reduction of the rotatable bowl caused by the discharge of the first amount of sediment;

based on the first rotational speed reduction as measured by the sensor, the processor determining a first value corresponding to the first amount of sediment based on the first rotational speed reduction and the stored data representing the first correlation;

the processor generating a second trigger signal to cause the centrifugal separator to discharge a second amount of sediment;

the sensor measuring a second rotational speed reduction of the rotatable bowl caused by the discharge of the second amount of sediment;

based on the second rotational speed reduction as measured by the sensor, the processor determining a second value corresponding to the second amount of sediment based on the second rotational speed reduction and the stored data representing the first correlation;

the processor determining data representing a second correlation, the second correlation being a correlation between the different amounts of discharges of the sediment and trigger signals, based on the first and second trigger signals and the first and second values corresponding to the first and second amounts of sediment;

the processor determining a third trigger signal corresponding to a desired amount of sediment to be discharged, based on the determined data representing the second correlation; and setting the centrifugal separator to operate to discharge the desired amount of sediment.

2. The method according to claim 1 further comprising storing the obtained third trigger signal as a calibrated signal to be used for discharging sediment in operation of the centrifugal separator.

3. The method according to claim 1, wherein determining data representing the second correlation includes interpolating or extrapolating other amounts of discharges of the sediment and trigger signals based on the comparison between the first and second trigger signals and the first and second values corresponding to the first and second amounts of sediment.

4. The method according to claim 1, wherein generating the second trigger signal includes generating a signal that is larger relative to the first trigger signal to discharge a greater amount of sediment as compared with the first amount of sediment.

5. The method according to claim 4, wherein generating the second trigger signal includes increasing a time period for discharging the second amount of sediment relative to a time period for discharging the first amount of sediment.

6. The method according to claim 1, wherein generating the trigger signals includes supplying a pressurized fluid for a predetermined period of time.

7. The method according to claim 6, wherein supplying the pressurized fluid includes using pressurized air or pressurized water.

8. The method according to claim 1, wherein obtaining the values corresponding to the first and second amounts of sediment includes obtaining weights or volumes of the first and second amounts.

9. A non-transitory computer readable medium that is part of a calibration system for a centrifugal separator, the centrifugal separator having a rotatable bowl with a disc stack, wherein the centrifugal separator receives an intake of unseparated liquid food that passes through the disc stack for separation into a heavy product phase, a light product phase and a sediment phase by centrifugal separation, and the calibration system is coupled to the centrifugal separator;

the non-transitory computer readable medium having stored thereon a program which, when executed by a computer, carries out a method comprising the steps of:

retrieving stored data representing a first correlation, the first correlation being a correlation between different amounts of discharges of the sediment and rotational speed reductions of the rotatable bowl due to the discharges;

generating a first trigger signal to cause the centrifugal separator to discharge a first amount of sediment;

operating a sensor of the calibration system to measure a first rotational speed reduction of the rotatable bowl caused by the discharge of the first amount of sediment;

based on the first rotational speed reduction as measured by the sensor, determining a first value corresponding to the first amount of sediment based on the first rotational speed reduction and the stored data representing the first correlation;

generating a second trigger signal to cause the centrifugal separator to discharge a second amount of sediment;

operating the sensor to measure a second rotational speed reduction of the rotatable bowl caused by the discharge of the second amount of sediment;

based on the second rotational speed reduction as measured by the sensor, determining a second value corresponding to the second amount of sediment based on the second rotational speed reduction and the stored data representing the first correlation;

determining data representing a second correlation, the second correlation being a correlation between the different amounts of discharges of the sediment and trigger signals, based on the first and second trigger signals and the first and second values corresponding to the first and second amounts of sediment;

determining a third trigger signal corresponding to a desired amount of sediment to be discharged, based on the determined data representing the second correlation; and setting the centrifugal separator to operate to discharge the desired amount of sediment.

10. A calibration system for a centrifugal separator having a rotatable bowl with a disc stack, wherein the centrifugal separator receives an intake of unseparated liquid food that passes through the disc stack for separation into a heavy product phase, a light product phase and a sediment phase by centrifugal separation, the calibration system comprising:

a memory in which data representing a first correlation is stored, the first correlation being a correlation between different amounts of discharges of the sediment and rotational speed reductions of the rotatable bowl due to the discharges;

an input unit configured to generate trigger signals to discharge different amounts of sediment, a sensor arranged to detect rotational speed reductions of the rotatable bowl that correspond to the different amounts of sediment; and a processor communicatively coupled to the memory and the sensor, the processor being configured to:

generate trigger signals to cause the centrifugal separator to discharge the different amounts of sediment;

determine values corresponding to the discharged different amounts of sediment based on the rotational speed reductions measured by the sensor caused by the discharges and the stored data representing the first correlation;

determine data representing a second correlation, the second correlation being a correlation between the discharged different amounts of and the trigger signals, based on the trigger signals and the determined values corresponding to the discharged amounts of sediment;

determine a desired trigger signal corresponding to a desired amount of sediment to be discharged, based on the determined data representing the second correlation; and set the centrifugal separator to operate to discharge the desired amount of sediment.

* * * * *